United States Patent
Cheiky

(10) Patent No.: US 7,657,363 B2
(45) Date of Patent: *Feb. 2, 2010

(54) FUEL INJECTOR HAVING ALGORITHM CONTROLLED LOOK-AHEAD TIMING FOR INJECTOR-IGNITION OPERATION

(75) Inventor: Michael C. Cheiky, Thousand Oaks, CA (US)

(73) Assignee: Transonic Combustion, Inc., Camarillo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/237,302

(22) Filed: Sep. 24, 2008

(65) Prior Publication Data

US 2009/0088952 A1    Apr. 2, 2009

Related U.S. Application Data

(63) Continuation of application No. 11/692,092, filed on Mar. 27, 2007, now Pat. No. 7,444,230.

(60) Provisional application No. 60/787,964, filed on Mar. 31, 2006.

(51) Int. Cl.
*G06F 19/00* (2006.01)
*F02M 51/00* (2006.01)
*F02G 5/00* (2006.01)

(52) U.S. Cl. .................. 701/106; 123/304; 123/480; 123/549; 701/104

(58) Field of Classification Search ............... 123/27 R, 123/297, 304, 525–527, 538, 549, 557, 558, 123/478, 670, 480, 486; 701/101–106, 110, 701/111, 115; 239/88, 135, 136
See application file for complete search history.

(56) References Cited

U.S. PATENT DOCUMENTS

| 3,675,630 A | 7/1972 | Stratton |
| 3,762,378 A | 10/1973 | Bitonti |
| 3,926,169 A * | 12/1975 | Leshner et al. ............... 123/297 |
| 3,960,121 A | 6/1976 | Backus |

(Continued)

FOREIGN PATENT DOCUMENTS

JP    10141170    11/1996

*Primary Examiner*—Willis R Wolfe, Jr.
(74) *Attorney, Agent, or Firm*—Sheppard Mullin Richter & Hampton; David E. Helsey

(57) ABSTRACT

The present invention provides an injector-ignition fuel injection system for an internal combustion engine, comprising an ECU controlling a heated catalyzed fuel injector for heating and catalyzing a next fuel charge, wherein the ECU uses a one firing cycle look-ahead algorithm for controlling fuel injection. The ECU may further incorporate a look-up table, auto-tuning functions and heuristics to compensate for the rapid rotational de-acceleration that occurs near top dead center in lightweight small ultra-high compression engines as may be used with this invention. The ECU may further ramp heat input to the injector in response to engine acceleration requests and, under such circumstances, may extend its look-ahead for up to four firing cycles.

26 Claims, 11 Drawing Sheets

U.S. PATENT DOCUMENTS

| | | | |
|---|---|---|---|
| 4,002,151 A | 1/1977 | Toyoda et al. | |
| 4,059,076 A | 11/1977 | Kosaka et al. | |
| 4,245,589 A | 1/1981 | Ryan | |
| 4,485,778 A | 12/1984 | Oliver | |
| 4,838,213 A | 6/1989 | Gerace | |
| 5,322,042 A | 6/1994 | di Priolo et al. | |
| 5,499,605 A | 3/1996 | Thring | |
| 5,609,297 A * | 3/1997 | Gladigow et al. | 239/135 |
| 5,806,013 A * | 9/1998 | Paielli | 701/106 |
| 5,857,436 A | 1/1999 | Chen | |
| 5,927,255 A | 7/1999 | Hubbard | |
| 5,950,921 A * | 9/1999 | Cain et al. | 239/1 |
| 6,119,670 A * | 9/2000 | Lavi | 123/674 |
| 6,314,925 B1 | 11/2001 | Britton | |
| 6,340,013 B1 | 1/2002 | Britton | |
| 6,422,214 B1 * | 7/2002 | Sealy et al. | 123/520 |
| 6,691,025 B2 | 2/2004 | Reimer | |
| 6,698,412 B2 * | 3/2004 | Dalla Betta | 123/670 |
| 6,789,514 B2 | 9/2004 | Suh et al. | |
| 6,871,792 B2 | 3/2005 | Pellizzari | |
| 6,880,501 B2 | 4/2005 | Suh et al. | |
| 6,913,004 B2 * | 7/2005 | Pellizzari et al. | 123/549 |
| 6,953,020 B2 | 10/2005 | Kojic et al. | |
| 6,953,024 B2 * | 10/2005 | Linna et al. | 123/435 |
| 7,444,230 B2 * | 10/2008 | Cheiky | 701/106 |
| 2002/0035984 A1 * | 3/2002 | Brardinelli et al. | 123/670 |
| 2005/0263136 A1 | 12/2005 | Rigney | |

* cited by examiner

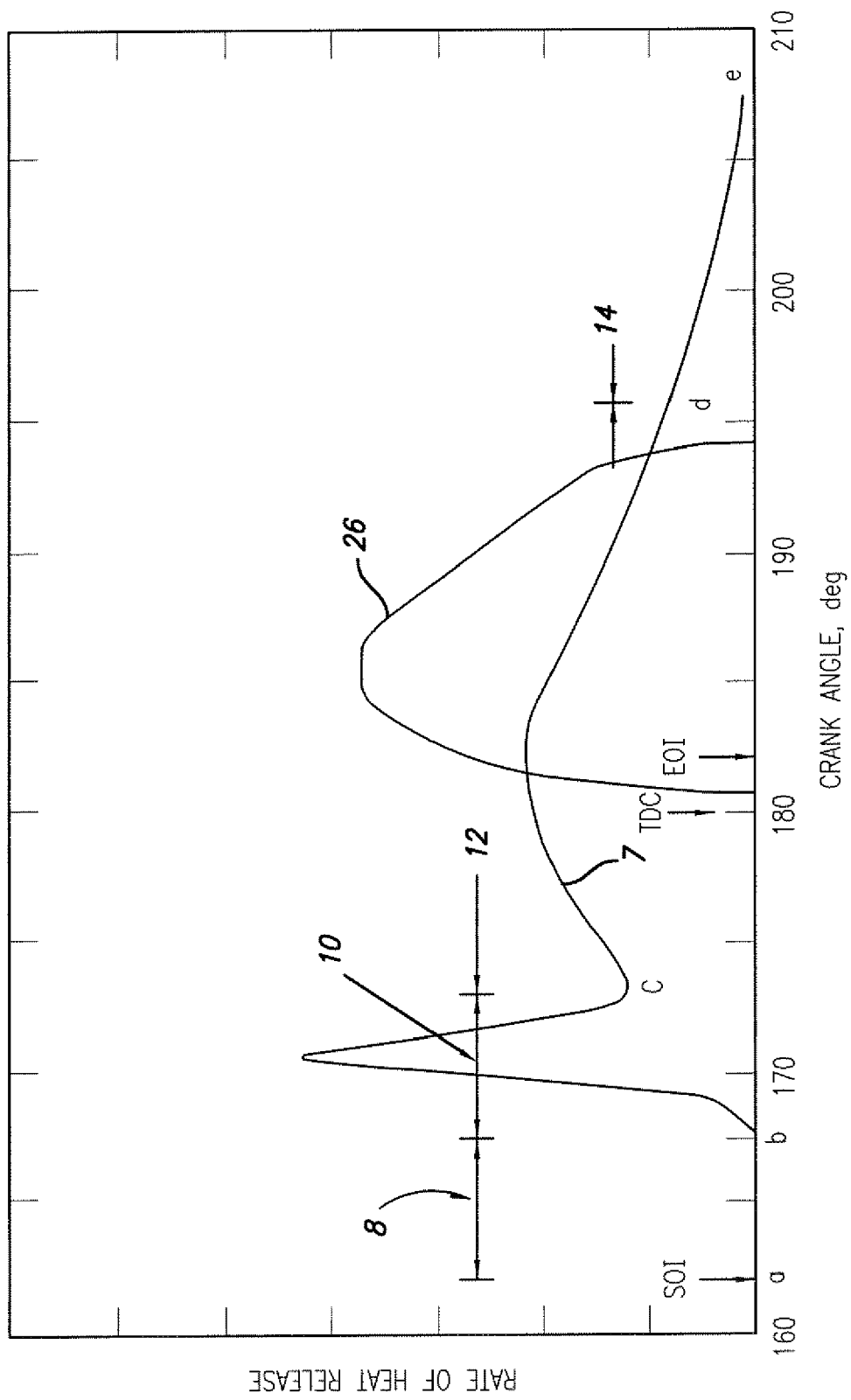

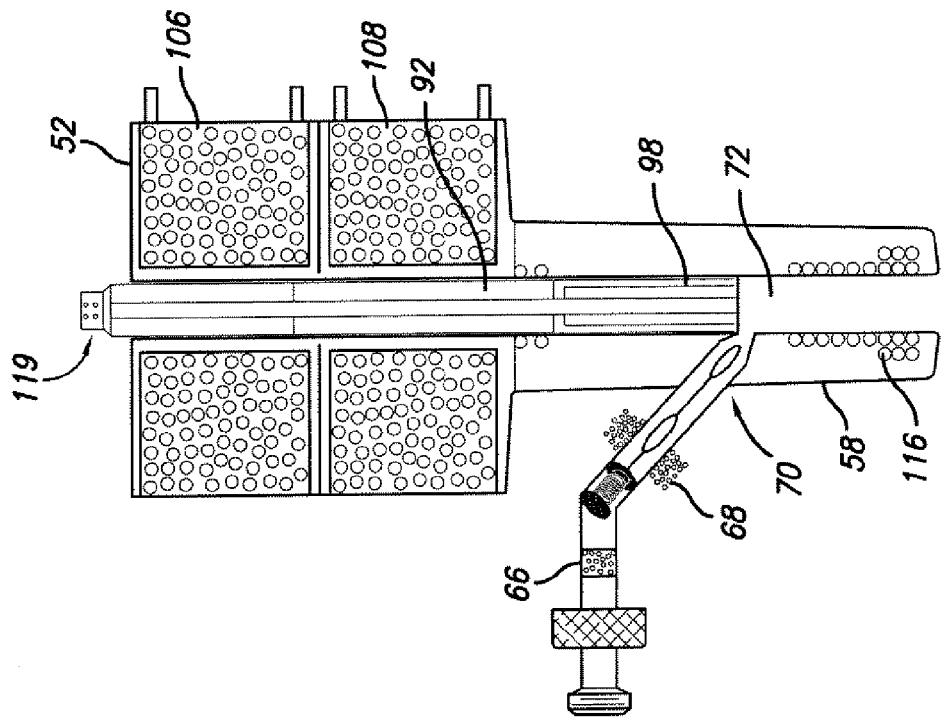
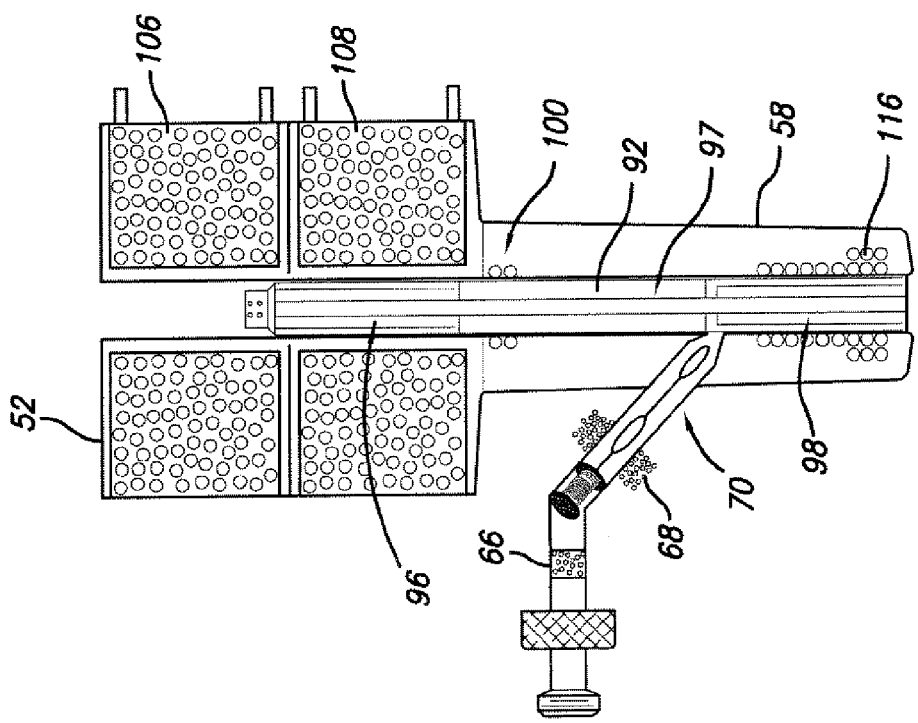

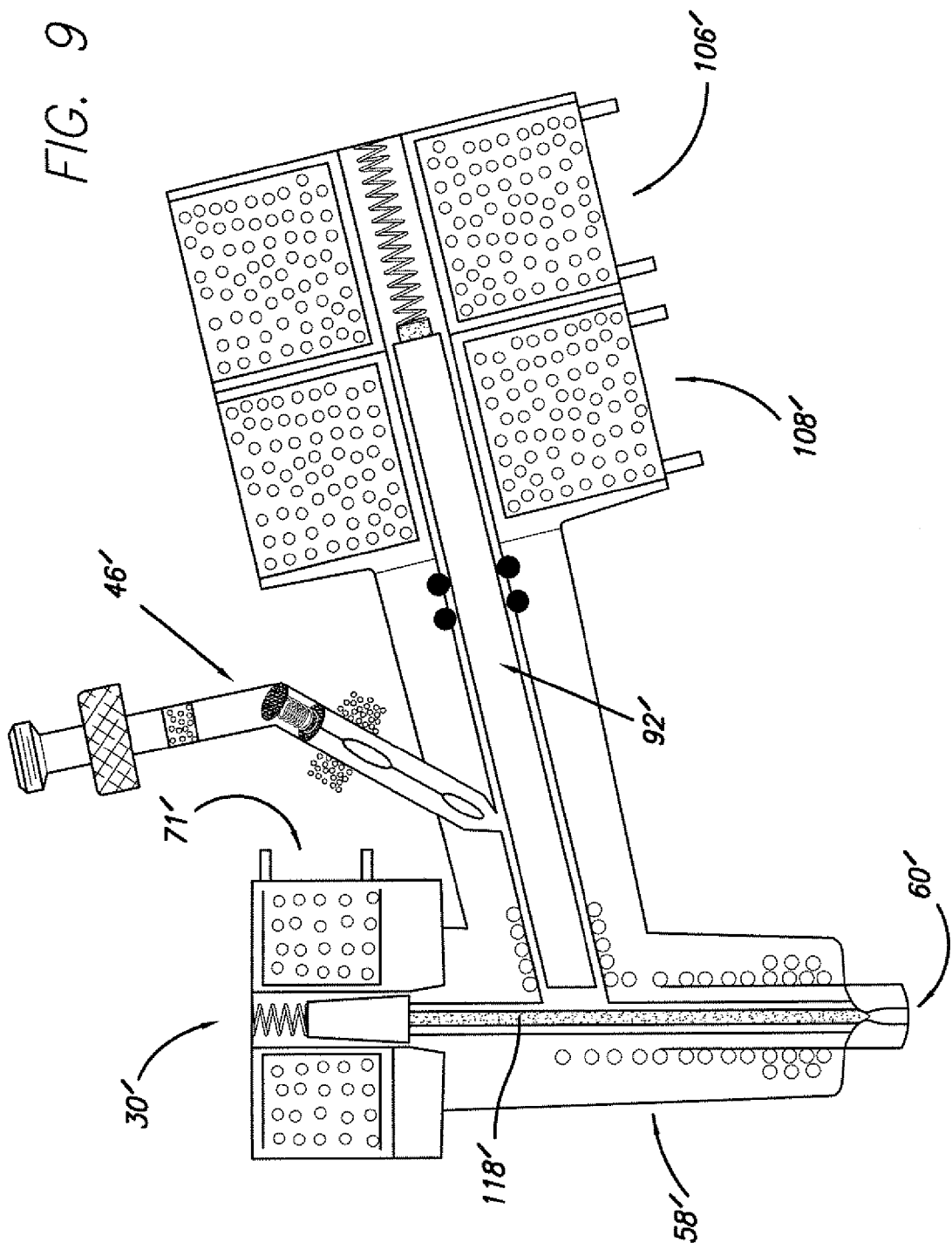

FUEL INJECTOR HAVING ALGORITHM CONTROLLED LOOK-AHEAD TIMING FOR INJECTOR-IGNITION OPERATION

REFERENCE TO RELATED APPLICATIONS

This application is a continuation of U.S. patent application Ser. No. 11/692,092, filed Mar. 27, 2007, now U.S. Pat. No. 7,444,230, issued on Oct. 28, 2008, which claims priority to U.S. Provisional Patent Application No. 60/787,964, filed Mar. 31, 2006. The contents of each of these applications are incorporated herein by reference in their entirety.

FIELD OF THE INVENTION

The invention broadly relates to fuel injection systems and more particularly to an injector-ignition fuel injector for an internal combustion engine having algorithm controlled timing for injector-ignition operation.

BACKGROUND OF THE INVENTION

Much of the world's energy consumption is dedicated to powering internal combustion based vehicles. Most gasoline and diesel car engines are only 20-30% efficient, such that a major portion of the hydrocarbon fuels is wasted, thereby depleting global resources while producing an excessive quantity of pollutants and greenhouse gasses. As illustrated in FIG. 1 (prior art), about one third of the energy used by a conventional engine manifests itself as waste heat in the cooling system (coolant load 4) while another approximately one third of the energy goes out the tailpipe (exhaust enthalpy 2) leaving one third or less to provide useful work (brake power 6). At the internal level, these inefficiencies are due to the fact that the conventional combustion process inside a spark ignition gasoline engine or compression ignition diesel engine takes far too long as compared to the rotational dynamics of the piston and crank (i.e., the power stroke of the engine).

FIG. 2 (prior art) illustrates a typical heat release profile 7 within a high efficiency direct injection Euro-diesel engine cycle, including an ignition delay period 8, a premixed combustion phase 10, a mixing-controlled combustion phase 12 and a late combustion phase 14. Combustion before about 180° of cycle rotation (top dead center) results in increased wasted heat load, while a large portion of the energy from combustion in the late combustion phase 14 (after about 200°) is wasted as exhaust heat. In other words, heat release during the time period starting when the piston is at the top of its stroke and rotating down about 20 degrees (from 180° to 200°) provides the highest percentage of useful work. The heat release before top dead center causes pushback against the rotation which manifests itself ultimately as waste heat in the cooling jacket. Ignition must be started early in gas and diesel engines because it requires a substantial amount of time to fully develop as compared to the rotational timing of the engine. In the late combustion phase 14, fuel continues to burn past the useful limit of the power stroke, thus dumping waste heat into the exhaust system.

SUMMARY OF THE INVENTION

The present invention involves the use of one or more heated catalyzed fuel injectors for dispensing fuel predominately, or substantially exclusively, during the power stroke of an internal combustion engine. The injector lightly oxidizes the fuel in a super-critical vapor phase via externally applied heat from an electrical heater or other means. The injector may operate on a wide range of liquid fuels including gasoline, diesel, and various bio-fuels. In addition, the injector may fire at room pressure, and up to the practical compression limit of internal combustion engines. Since the injector may operate independent of spark ignition or compression ignition, its operation is referred to herein as "injection-ignition".

According to the invention, a preferred injector-ignition fuel injection system for an internal combustion engine comprises an engine control unit (ECU) controlling a heated catalyzed fuel injector for heating and catalyzing a next fuel charge, wherein the ECU uses a one firing cycle look-ahead algorithm for controlling fuel injection. The look-ahead algorithm may comprise a computer software program residing on the ECU, the software program comprising machine readable or interpretable instructions for controlling fuel injection. In operation, the algorithm compares a current throttle input to prior engine data and determines a fuel load and an estimated time to the next firing. By way of example, the prior engine data may comprise a last throttle input, an engine load, an RPM value, and an air inlet temperature. According to some embodiments, the next fuel charge comprises a mixture of approximately 65% heptane, 25% cetane, and 10% ethanol by volume. The injector-ignition injector can fire at atmospheric pressure; however, in a preferred embodiment of the invention, the injector fires at high pressure.

According to the invention, the ECU may control various aspects of engine operation such as (i) the quantity of fuel injected into each cylinder per engine cycle, (ii) the ignition timing, (iii) variable cam timing (VCT), (iv) various peripheral devices, and (v) other aspects of internal combustion engine operation. The ECU determines the quantity of fuel, ignition timing and other parameters by monitoring the engine through sensors, including MAP sensors, throttle position sensors, air temperature sensors, engine coolant temperature sensors and other sensors.

The fuel charge is preferably heated and catalyzed in the presence of one or more oxygen sources, wherein the algorithm controls pre-oxidation hold time within a pressurization chamber of the fuel injectors. In some embodiments, the algorithm identifies appropriate pre-oxidizer hold time settings in an ECU database based upon a predetermined fuel mixture in use. The ECU database contains a pre-loaded table spanning a range of fuel octane ratings and oxygenator additives that may be encountered, wherein the oxygenator additives may be selected from the group consisting of methyl tert-butyl ether (MTBE), ethanol, other octane and cetane boosters, and other fuel oxygenator agents. The algorithm continuously tunes its operation over the range of fuel octane ratings by sensing ignition delay.

The injector ignition fuel injection system set forth herein heats liquid fuels well beyond their room pressure boiling point. However, like water, most hydrocarbon fuels and alcohols are subject to elevated boiling point with elevated pressure so that as a liquid is heated under pressure, it will stay in liquid form well above its atmospheric boiling point, and will re-condense to liquid phase if it is vaporized at low pressure and then rapidly pressurized. There is, however, a point of pressure and temperature at which it is no longer possible to maintain a liquid phase or re-compress to a liquid phase. This is commonly called the critical point and includes a critical temperature and a critical pressure. Above the critical temperature and pressure, it is no longer possible to for a liquid, so the molecules interact in the gas phase even though they may be compressed beyond the density of a corresponding liquid. As per the CRC Handbook 87th Edition, the critical temperature for heptane (a major component of gasoline) is 512° F. and the critical pressure is 397 psi.

The injector-ignition system of the invention utilizes oxygen reduction catalysts which work predominately in the vapor or super-critical fluid phase. The catalyst combines available oxygen in the range of 0.1% by weight to 5% by weight with one or more components within the fuel mixture to form highly reactive, partially oxidized radicals which will very rapidly continue to oxidize once exposed to the much richer oxygen environment of the main combustion chamber. The actual number of such active radicals required for very fast combustion (in the 100 microsecond range or less) is very small, and is largely dependent on the mean free path of the molecules and the reaction wavefront propagation delay within the main combustion chamber reaction zone. For example, at atmospheric pressure, and under the appropriate conditions of temperature and oxygen concentration, the combustion wavefront moves at approximately the speed of sound which, under typical circumstances, is about 1 foot per millisecond. Accordingly, targeting a main chamber combustion delay of 10 microseconds indicates that these free radicals need to be dispersed on the order of 0.1 inches apart or closer which, based on the very large number of molecules per cubic inch, requires an exceedingly small concentration of such radicals.

Likewise, each radical that is formed in the fuel injector utilizes chemical bond energy from the fuel such that the chemical bond energy in the main combustion chamber is reduced by that amount. It is therefore highly advantageous to minimize the number of free radicals formed to a level high enough to insure very high rate ignition, but low enough to minimize the degradation of the energy content of the injected fuel. In addition, most oxygen reduction catalysts also act as thermal cracking catalysts, particularly when heated to elevated temperatures in the 1,000° F. range and higher. Thermal cracking of the fuel in the injector is highly undesirable because it leads to carbon formation which initially fouls the catalytic surface and, if allowed to continue, actually impedes the flow of fuel through the injector. In addition short chain cracked components typically have higher auto-ignition temperatures and higher heats of vaporization than octane and heptane, such that under commonly occurring laboratory conditions, excessively heating the injector will actually increase the ignition delay beyond the ideal situation as described above and also lead to rapid carbon formation.

In view of the above, the injector-ignition injectors described herein optimally utilize a highly dispersed (i.e., low concentration) oxygen reduction catalyst that has moderate activity at temperatures and pressures at which most of the fuel components are in the super-critical phase. Nickel has been found to be one such catalyst and operates in the range of 600-750° F. at 100 bar.

In accordance with the principles of the invention, the required heat input to the fuel may be minimized by carefully controlling the external source of heating in conjunction with the fuel flow rate and fuel catalyst contact surface area, to produce an appropriate number of radicals without allowing the catalyzed oxidation process to significantly contribute thermal energy to the reaction zone. Such additional thermal energy would rapidly lead to thermal runaway and potentially consume all available oxygen, thereby significantly reducing the energy content of the resultant fuel and promoting carbon formation. This is of particular concern since commercial fuels may contain 1% to 10% oxygenator agents.

According to the invention, the fuel charge may be catalyzed using a catalyst selected from the group consisting of nickel, nickel-molybdenum, alpha alumina, and aluminum silicon dioxide, other air electrode oxygen reduction catalysts, and other catalysts used for hydrocarbon cracking. In one embodiment of the invention, the fuel charge is catalyzed using a catalyst comprising nickel with about 5% molybdenum. According to certain embodiments, the catalytic heating temperature is preferably between 600° F. and 750° F., most preferably about 720° F. In addition, injector pressure is preferably high enough that the fuel charge operates as a super-critical fluid at a selected temperature setting. The algorithm controls the fuel injector to dispense the fuel charge substantially exclusively during a power stroke of the internal combustion engine.

According to one embodiment, the fuel injector runs on high octane rated fuels, high cetane rated fuels, and mixtures of gas engine fuels and diesel engine fuels. The ECU may include a supplemental input for receiving fuel mixture information to accommodate a range of fuels and fuel mixtures. The fuel mixture information is provided using a direct entry scheme at fueling or using an on-board analyzer which samples the fuel on board and communicates engine operating parameters to the ECU.

In accordance with the principles of the invention, preparation for a next engine firing starts immediately upon completion of a last engine firing wherein the fuel injector is substantially empty of fuel. The algorithm may adjust energy input into the fuel injector such that the fuel is heated to a selected temperature more rapidly at higher throttle settings than at lower throttle settings. Additionally, the algorithm allows up to four firing cycles of fuel to build up in the hot section to increase fuel heating exposure time during rapid acceleration. Waste heat is minimized by initiating a rapid burn ignition substantially at top dead center.

According to further embodiments of the invention, the ECU provides an injector fire signal approximately 1-3 milliseconds before top dead center to offset mechanical delay when the engine is rapidly decelerating due to compression braking. Additionally, the ECU may include an engine look-up table which corrects for engine deceleration over a predetermined operating map including RPM, engine load, and engine load trend. The engine look-up table may be pre-loaded with a learning algorithm to measure the error in predicted top dead center versus actual top dead center for a particular class of engine geometry. Additionally, the engine look-up table may be dynamically adjusted in operation through use of a learning algorithm which continually adjusts table entries by computing the difference between an injection pin location indicator and an absolute top dead center indicator. The adjustment may be further refined using knock sensor input, or using an in cylinder pressure sensor which detects absolute fire position versus top dead center. According to additional embodiments, the ECU utilizes pattern recognition heuristics to fine tune ignition delay drift due to compression braking, wherein pattern recognition heuristics provide for the identification of a steady state throttle and load condition, so that ignition timing drift can be isolated from other variable parameters.

Another embodiment of the invention features an injector-ignition fuel injection system for an internal combustion engine, comprising an ECU controlling a heated catalyzed fuel injector for heating and catalyzing a next fuel charge, wherein the ECU uses a one firing cycle look-ahead algorithm for controlling fuel injection, wherein the heated catalyzed fuel injector comprises an input fuel metering system for dispensing a next fuel charge into a pressurizing chamber, a pressurization ram system including a pressurization ram for compressing the fuel charge within the pressurizing chamber, wherein the fuel charge is heated in the pressurization chamber in the presence of a catalyst, and an injector nozzle for injecting the heated catalyzed fuel charge into a combustion chamber of the internal combustion engine.

In the above-described system, preparation for a next engine firing starts immediately upon completion of a last engine firing. Upon completion of the last engine firing, the fuel injector is substantially empty of fuel, the pressurization ram is in a full displacement position, and the injector nozzle is closed. A next firing cycle involves retracting the pressurization ram, which allows the input fuel metering system to dispense an aerosol of liquid fuel into the pressurization chamber. The pressurization ram then pressurizes the fuel in a two step cycle, including protecting the fuel injector while the fuel is heating and vaporizing, and pressurizing the fuel to a target injection pressure and temperature. The fuel is vaporized to reach the target injection pressure and temperature. During operation, the injector nozzle opens after a pre-determined hold time and the pressurization ram pushes the fuel charge into the combustion chamber such that the pressurization ram reaches a full displacement position. In some embodiments, the pre-determined hold time is back projected from a next top dead center event.

BRIEF DESCRIPTION OF THE DRAWINGS

FIG. 4 is a schematic diagram illustrating a heat release profile for an internal combustion engine having a fuel injector in accordance with the principles of the invention;

FIG. 5A is a sectional view of the fuel injector of FIG. 6, wherein the ram is in a full displacement position, whereas FIG. 8B is a sectional view of the fuel injector of FIG. 6, wherein the ram is in a fully retracted position for allowing liquid fuel to enter the pressurization chamber; and FIG. 9 is a sectional view of an alternative fuel injector of the invention comprising a linear fuel injector.

DETAILED DESCRIPTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

In accordance with the principles of the present invention, an injector-ignition fuel injection system for an internal combustion engine is provided, the system comprising an engine control unit (ECU) controlling a heated catalyzed fuel injector for heating and catalyzing a next fuel charge, wherein the ECU uses a one firing cycle look-ahead algorithm for controlling fuel injection.

Detonation comprises an alternative form of combustion that provides an extremely fast burn and is commonly manifested as the familiar knock in mistuned car engines. Conventional internal combustion engines place their entire fuel load in the cylinder before ignition. Detonation causes a significant portion of the entire fuel load to ignite in a few microseconds, thus producing an excessive pressure rise which can damage engine parts. These conditions typically occur in an uncontrolled fashion in mistuned engines causing the fuel to detonate at some time other than appropriate for power stroke production. In addition, this type of detonation is dependent on an ignition delay to compress the air supply and vaporize the fuel.

Figure 3:
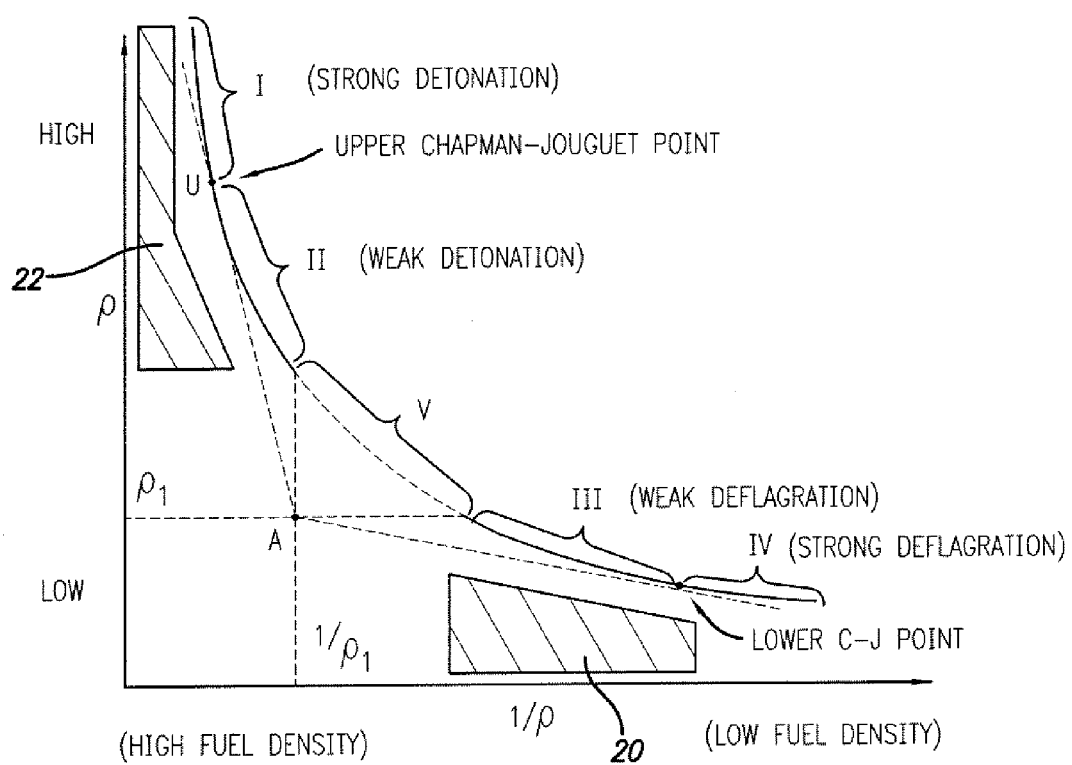
FIG. 3 is a schematic diagram that illustrates the difference between ignition in a conventional gas engine and ignition in an internal combustion engine having a fuel injector in accordance with the principles of the invention.

Referring to FIG. 3, a schematic diagram is provided that illustrates the difference between slow combustion in a conventional gas engine and fast combustion including detonation in an internal combustion engine having a fuel injector in accordance with the principles of the invention. In particular, ignition in a conventional gas engine substantially occurs in a slow burn zone 20 at low fuel density. By contrast, in an internal combustion engine having a fuel injector as described herein, ignition substantially occurs in a fast burn zone 22 at high fuel density. In the fast burn zone 22, a leading surface of the fuel charge is completely burned within a matter of microseconds.

Figure 1:
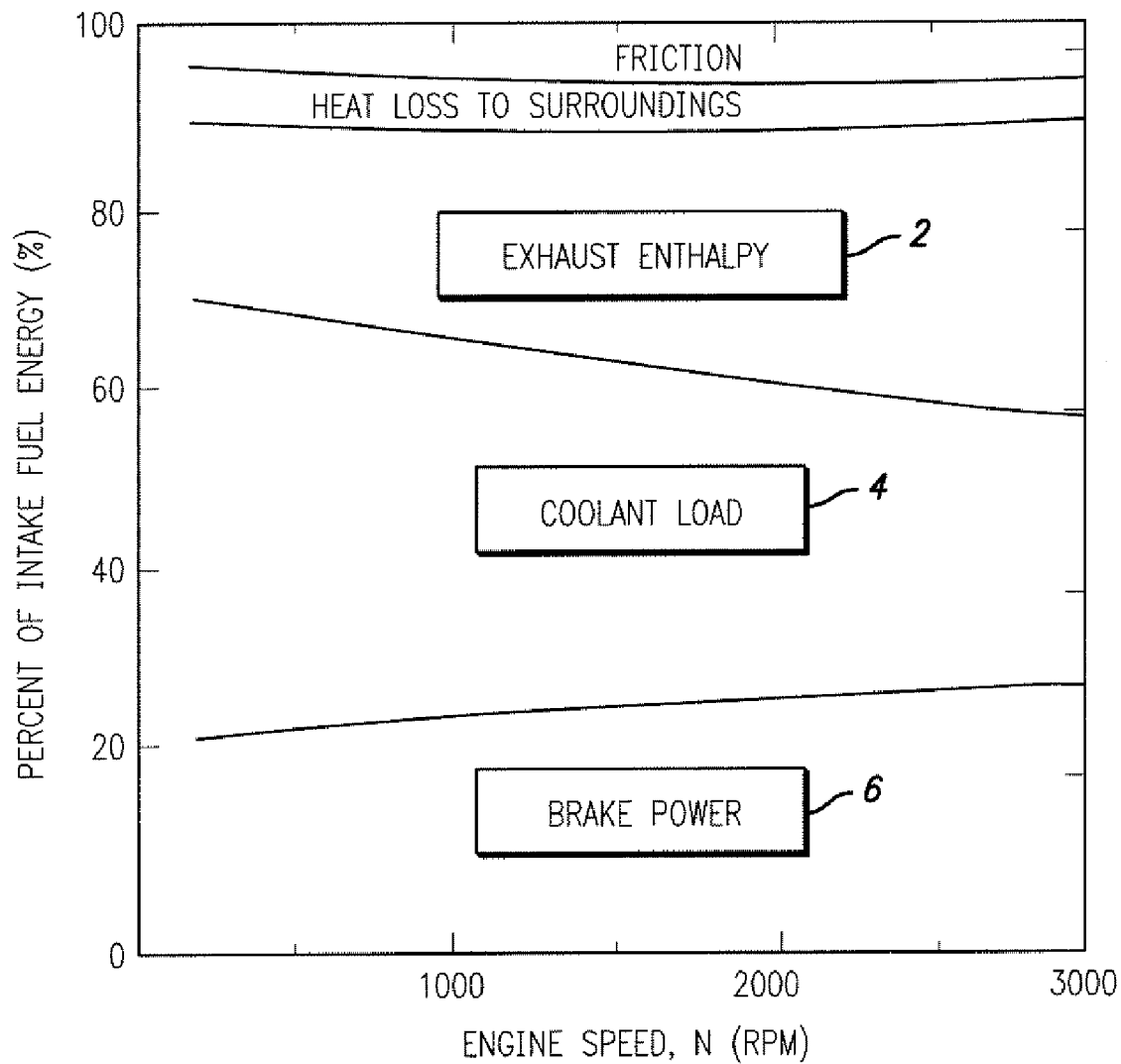
FIG. 1 (prior art) is a schematic diagram that illustrates the inefficiencies in a conventional combustion process inside a spark ignition gasoline engine or a compression ignition diesel engine.
Figure 2:
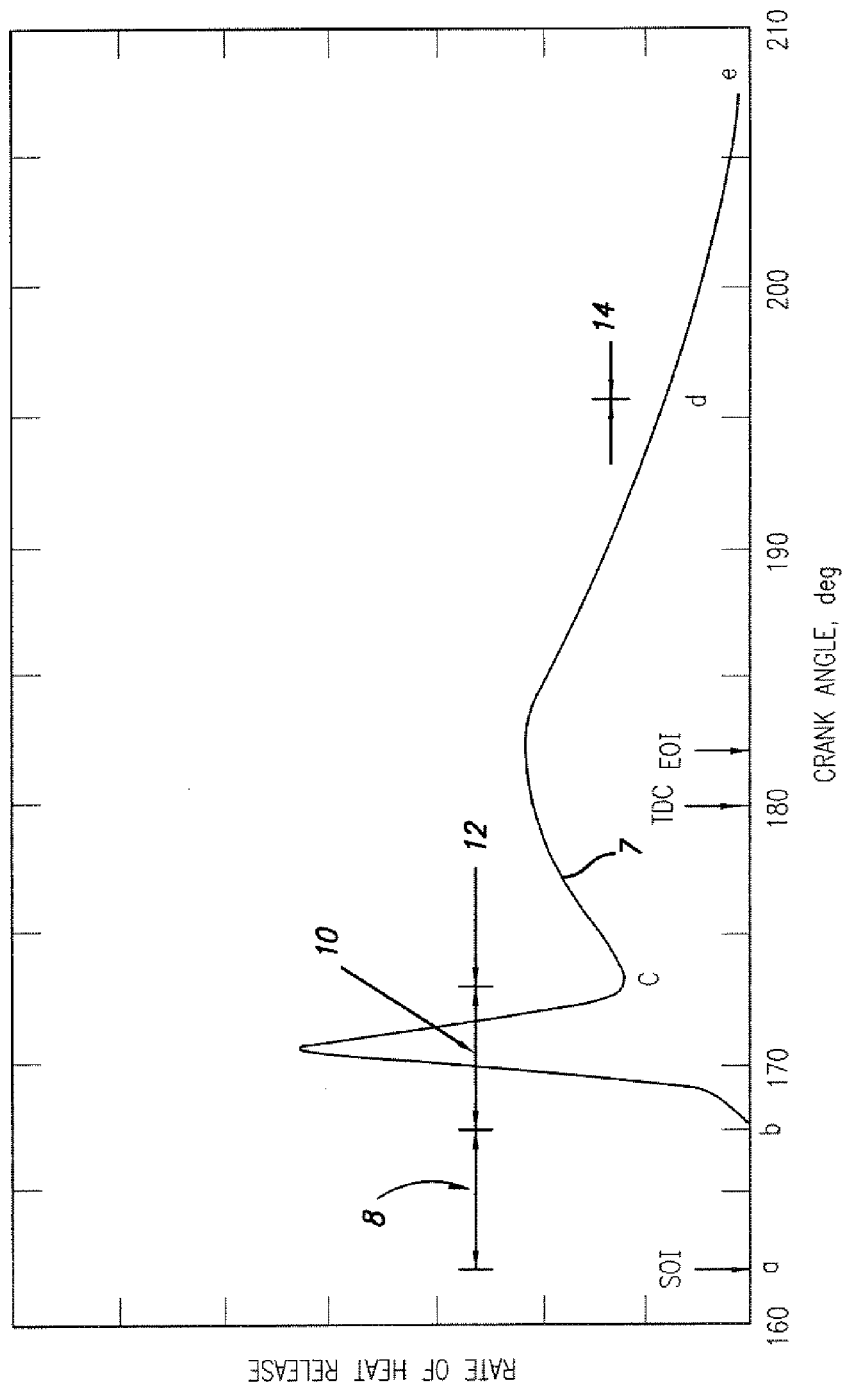
FIG. 2 (prior art) is a schematic diagram that illustrates a typical heat release profile within a high efficiency direct injection Euro-diesel engine cycle.

Referring to FIG. 4, a schematic diagram is provided that illustrates a heat release profile 26 for an internal combustion engine having a fuel injector in accordance with the principles of the invention. Particularly, the heat release profile 26 is superimposed over the typical heat release profile 7 of the direct injection Euro-diesel engine cycle depicted in FIG. 2, the heat release profile 7 including an ignition delay period 8, a premixed combustion phase 10, a mixing-controlled combustion phase 12, and a late combustion phase 14. In contrast to the direct injection Euro-diesel engine, the fuel injector set forth herein (having heat release profile 26) precisely meters instantly igniting fuel at an appropriate crank angle for optimal power stroke production. Specifically, the fuel injector dispenses instantly burning fuel in a precise fashion substantially exclusively during the power stroke, thereby greatly reducing both front end (cooling load) and back end (exhaust enthalpy) heat losses within the engine. According to some embodiments of the invention, conventional low octane pump gasoline is metered into the fuel injector, wherein the fuel injector heats, vaporizes, compresses and mildly oxidizes the fuel charge, and then dispenses it as a relatively low pressure gas column into the center of the combustion chamber.

Figure 5A:
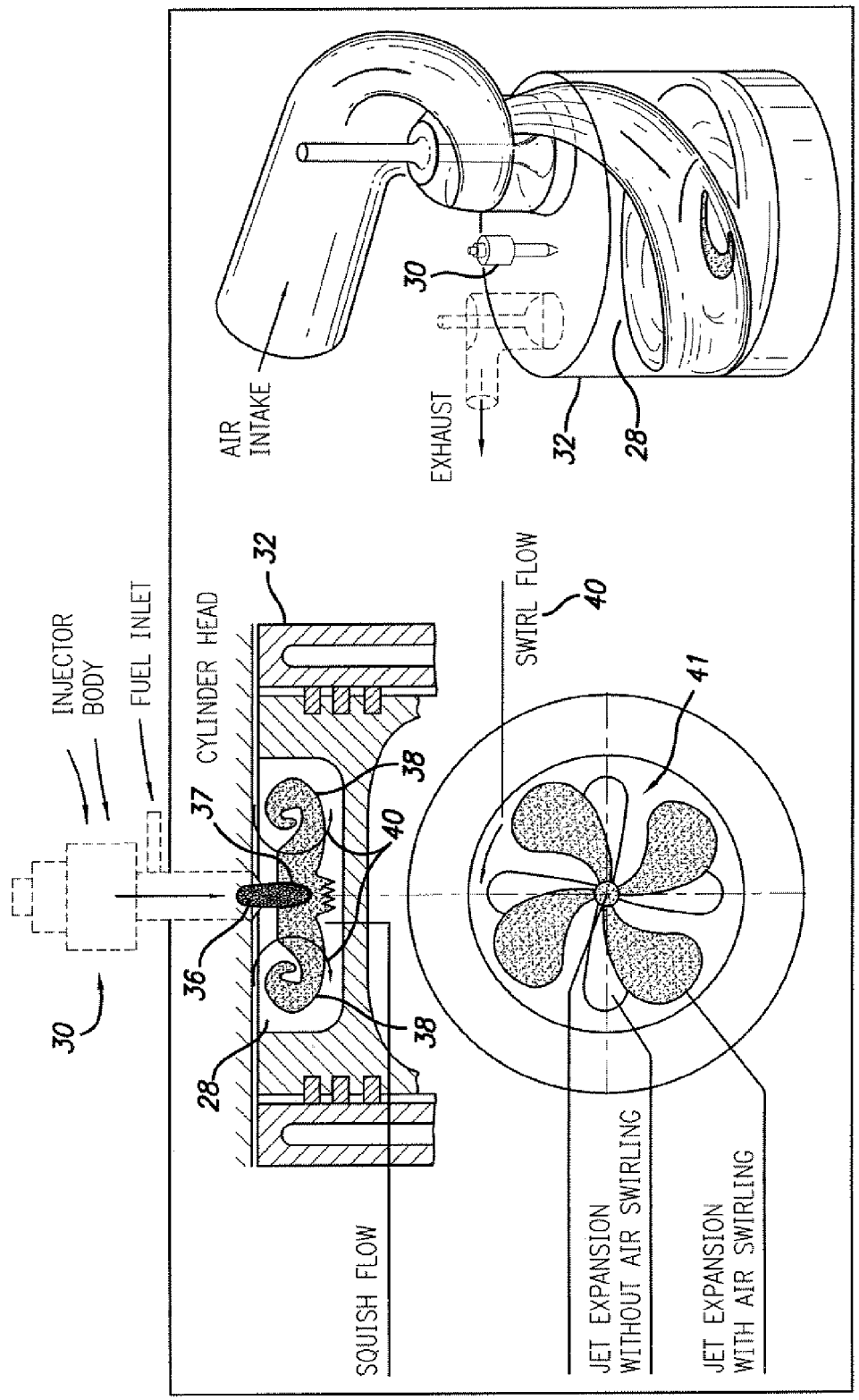
FIG. 5A depicts a combustion chamber for the internal combustion engine of the invention including a fuel injector mounted substantially in the center of the cylinder head.

Referring to FIG. 5A, a combustion chamber 28 for an internal combustion engine is illustrated comprising a conventional automotive diesel high swirl high compression combustion chamber. Particularly, the combustion chamber 28 includes a heated catalyzed injector-ignition fuel injector 30 of the invention mounted substantially in the center of the cylinder head 32. As a fuel column 36 of hot gas is injected into the combustion chamber 28, its leading surface 37 auto-detonates, which radially dispenses the fuel column 36 into a swirl 38 pattern in a direction indicated by arrows 40. The leading surface 37 represents the detonation interface, while the swirl 38 represents dispersed gas and air yielding fast lean burn. Such a combustion chamber configuration provides a fairly conventional lean burn environment, wherein 0.1% to 5% of the fuel has been pre-oxidized in the fuel injector 30 by use of high temperature and pressure. The fan-shaped element 41 of FIG. 5A depicts the rotational movement of the radially expanding fuel charge it swirls within the combustion chamber 28. The fuel charge may expand symmetrically or may be comprised of one or more offset rows of jets, each row including a plurality of jets (e.g., four jets). As would be appreciated by those of skill in the art, any number of jets may be formed without departing from the scope of the invention.

With further reference to FIG. 5A, pre-oxidation within the heated catalyzed fuel injector 30 may involve surface catalysts on the injector chamber walls and oxygen sources including standard oxygenating agents. Optionally, pre-oxidation may further involve a small amount of additional oxygen, e.g., from air or the last firing in the form of recirculated exhaust gas. This slightly oxidized fuel contains radicals in the form of $RO_2$. and ROOH., which are highly reactive, partially oxidized, cracked hydrocarbon chains from the initial fuel. Thus, the injected fuel provides relatively low temperature auto-ignition sites within the dispensed fuel column 36 which supports the initiation of surface auto-detonation and subsequent lean burn within a temperature and pressure range compatible with conventional automotive engine construction materials.

Figure 5B:
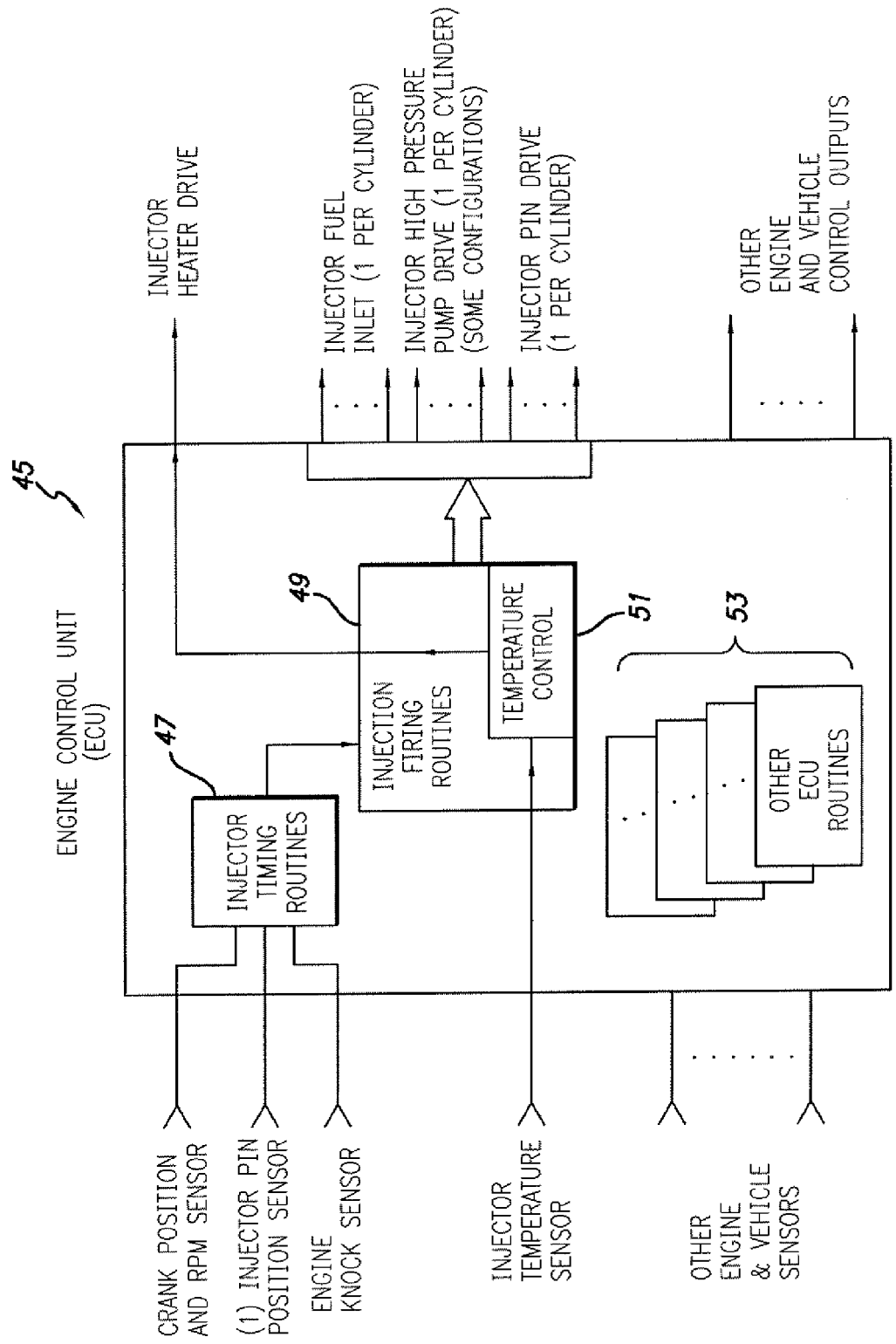
FIG. 5B is a schematic diagram illustrating an exemplary ECU for controlling fuel injection in accordance with the principles of the invention.

Referring to FIG. 5B, an exemplary ECU 45 for controlling fuel injection and other engine operations is illustrated. Specifically, the ECU 45 includes an injector timing routine 47 which determines when the injector will fire, an injection firing routine 49 which sequences the mechanical operation of the injector subsystems, a temperature control 51 for controlling an injector heating drive, and other ECU routines 53 controlling other engine and vehicle outputs. In operation, the injection timing routine 47 receives inputs from a crank position and RPM sensor, an injector pin position sensor, and an engine knock sensor. The injection timing routine 47 outputs the timing routine to the injection firing routine 49, which controls an injector fuel inlet (1 per cylinder), an injector high pressure pump drive (1 per cylinder in some configurations), and an injector pin drive (1 per cylinder). The injector firing routine 49 may further receive input from the ECU engine throttle routine and various other engine sensor routines as typically found on modern gasoline and diesel engines to adjust for changes in temperature, pressure, humidity, engine load, fuel quality, engine wear, and other variables. The temperature control 51 of the ECU 45 receives inputs from an injector temperature sensor and, in turn, controls the injector heating drive. The various other ECU routines 53 receive inputs from various other engine and vehicle sensors, such that the ECU routines 53 control various additional engine and vehicle outputs.

Figure 5C:
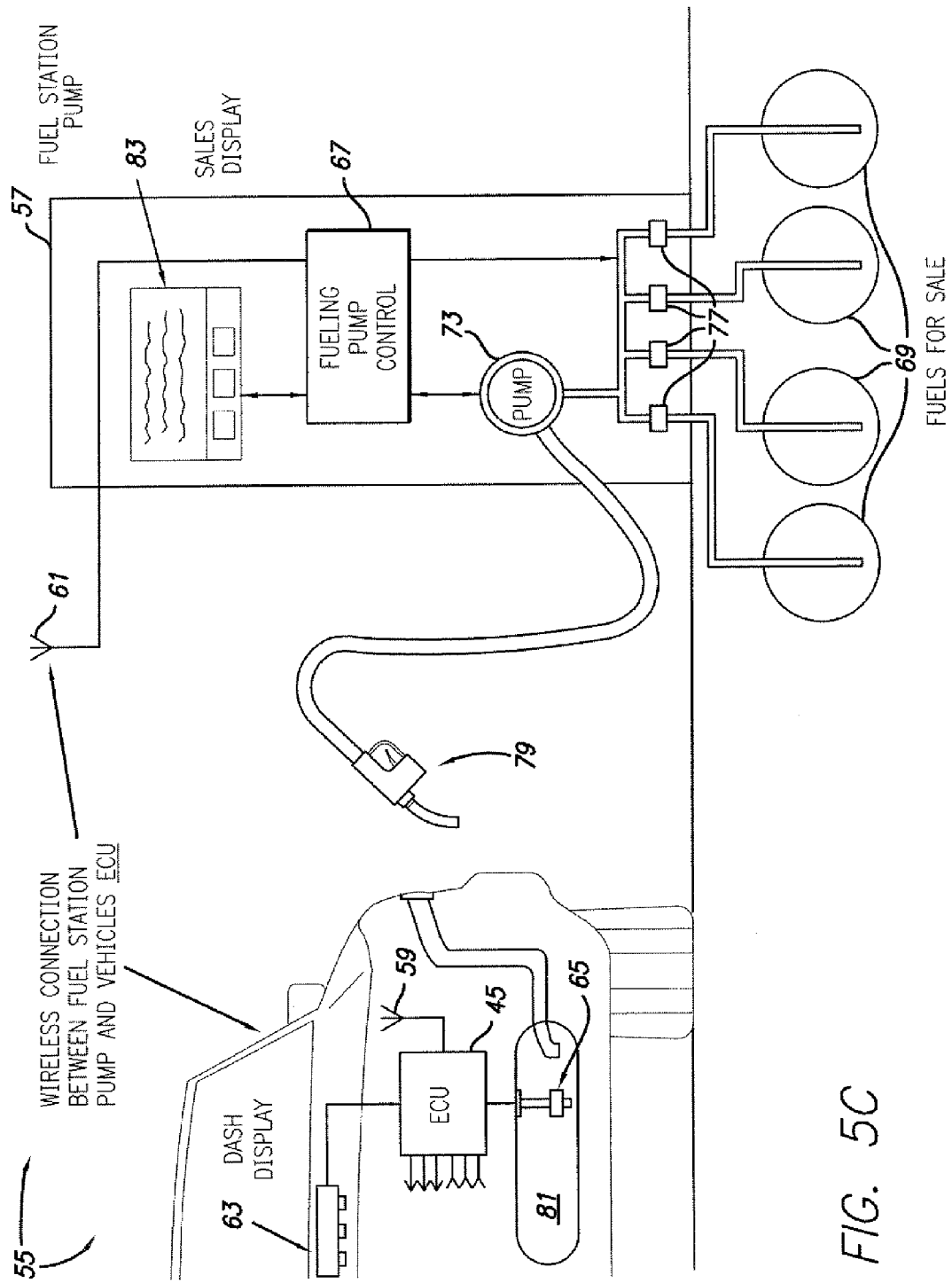
FIG. 5C is a schematic diagram illustrating wireless communication between the ECU of FIG. 5B and a conventional gasoline pump fuel nozzle.

Referring to FIG. 5C, further embodiments of the invention feature a smart fueling system 55 for a multi-fuel vehicle having an advanced variable cycle engine and an ECU (e.g., the ECU 45 of FIG. 5B) in communication with a conventional filling station fueling pump 57 by way of wireless several communications links 59, 61 that may be co-located with the ECU 45 and the fueling pump 57, respectively. The system 55 is employed to offer customers one or more optimized fuel blends for refueling their multi-fuel vehicles. This information may be shown on an in-dash display 63 in communication with the ECU 45 as well as on the sales display 83 of the fuel station pump 57. The user may make a fuel selection based on buttons, touch sensitive areas or other conventional input means on display 83 and, optionally, on the in-dash display 63. Data exchange between the ECU 45 and the fueling pump 57 may be provided by any conventional wireless communication technology such as magnetic induction, optical communications, or low power RF. In operation, the ECU 45 communicates to the fueling pump 57 the precise fuel mixture and amount of fuel in the vehicle's tank 81, which is determined by way of a fuel tank sensor 65. In response, a fueling pump controller 67 calculates appropriate refueling mixtures that are compatible with the remaining fuel and the vehicle's operational capabilities, and offers the customer one or more refueling options based upon various fuels 69 (or mixtures thereof that are for sale. Upon purchase, the appropriate fuel or fuel mixture is pumped (via fuel pump 73) through pump valves 77 and injected into the tank 81 via fueling pump nozzle 79.

With further reference to FIG. 5C, the refueling options may be based upon selectable parameters including cost and performance, wherein the filling station fueling pump 57 blends and dispenses the fuel based upon the customer's selections. In the illustrated embodiment, the filling station fueling pump 57 includes a point of sale display 83 and an associated means for user input. The ECU 45 determines actual fuel performance during combustion using engine performance under load (engine RPM), load sensors and knock sensors. Additionally, the ECU 45 may be configured to maintain a log of all fuel loadings including the precise mixture of fuels and the amount pumped into the tank, fuel consumption, observed performance, and chronological climate conditions such as temperature, barometric pressure, altitude and humidity.

The advanced variable cycle engine may be adapted to operate with a wide range of fuels including, but not limited to, conventional gasoline, diesel, ethanol, methanol, other alcohols, biodiesel, and plant extracts optionally including blended water content. The vehicle may be equipped with a single fuel tank, or multiple fuel tanks for accommodating incompatible fuel blends. Purchasing decisions at the pump may be based upon multiple factors such as the most cost effective fuel supply available, the fuel mixture remaining in the fuel tank, and anticipated driving conditions including weather and altitude. The vehicle is capable of dynamically adapting to various fuel mixtures under control of the ECU.

According to further embodiments of the invention, the heated catalyzed fuel injector 30 may be utilized in an injector engine that runs on a bio-renewable flex fuel. By way of example, the flex fuel may comprise plant extract oil (e.g., soybean oil, canola oil, algae and plankton extractions) that is mixed with small quantities of gasoline and/or ethanol. The resultant mixture may comprise a zero net carbon bio-renewable flex fuel suitable for use with for ultra-high compression engines equipped with heated, catalyzed direct-injectors. Such a zero net carbon fuel produces no net carbon in the Earth's biosphere when burned because the carbon present in the plant material is from captured carbon dioxide in the Earth's atmosphere as part of the normal photosynthesis process. According to the invention, raw plant oils are mixed with ethanol in conjunction with a small quantity of conventional gasoline (or other mixtures of linear hydrocarbons in the range of C5 to C10. By way of example, the mixture may contain 65% plant oil (by weight) mixed with 25% gasoline and 10% ethanol. The mixture is stable and does not separate into its various constituents under normal handling conditions. In addition, the mixture has a freezing point below 0° F. and is resistant to biological attack.

The fuel mixture described above is composed of high cetane plant oil which ignites well under the high compression of a diesel engine, as well as relatively high octane hydrocarbons (heptane) and ethanol, which perform well in low compression spark ignition engines, but do not typically perform well in compression ignition engines. For example, a high compression engine (e.g., 20 to 1) equipped with an injector that is both heated and contains oxygen reduction catalysts runs very effectively on the above-identified mixture. In addition, the heating directly accommodates the higher viscosity of the plant oils and also facilitates starting in cold environments. Additionally, the combination of heating and oxygen reduction catalysts attacks the oxygen bound in the ethanol to lightly oxidize the fuel mixture such that it burns very rapidly in the combustion chamber independent of the octane and cetane ratings of its components.

The above-described bio-renewable flex fuels are preferably catalyzed in the gas phase or super-critical phase only (as opposed to the liquid phase). In addition, the catalyzed smoldering fuel is preferably injected using a high pressure nozzle dispersal system at 100 bar or more, in contrast to conventional pre-chamber systems which rely on relatively slow and inefficient gas diffusion between the chambers or a low pressure intake manifold port valve.

According to the invention, the heated catalyzed fuel injector 30 may be mounted in place of a conventional direct diesel injector on a small automotive diesel engine. The converted diesel engine may run on gasoline and operate at high compression ratios in the range of 16:1 to 25:1. To achieve the high compression ratios, the engine preferably employs compression heating rather than a conventional spark ignition. As would be appreciated by those of ordinary skill in the art, the fuel injector of the invention may be used with other fuels such as diesel fuel and various mixtures of cetane, heptane, ethanol, plant oil, biodiesel, alcohols, plant extracts, and combinations thereof, without departing from the scope of the invention. Nevertheless, operation using the much shorter hydrocarbon length gasoline is preferred in many applications over diesel fuel since it produces virtually no carbon particulate matter.

Figure 6:
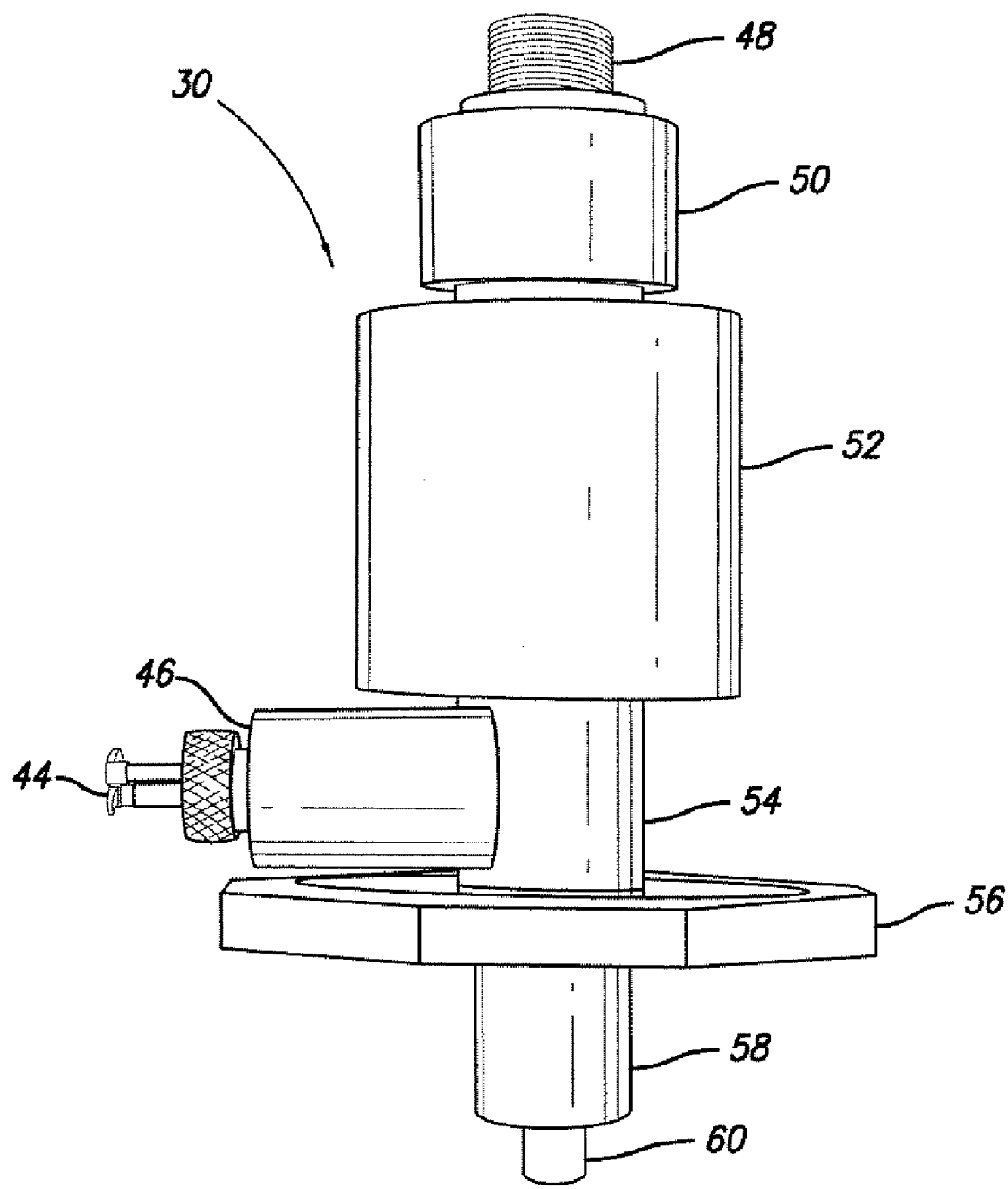
FIG. 6 depicts a preferred heated catalyzed injector-ignition fuel injector constructed in accordance with the principles of the present invention.

Referring to FIG. 6, a preferred heat catalyzed injector-ignition fuel injector 30 of the invention comprises a heated catalyzed all-in-one injector-ignition injector including a fuel input 44, an input fuel metering system 46, electrical connectors 48, a nozzle pin valve driver 50, a pressurization ram driver 52, an optional air inlet pinhole 54, a mounting flange 56, a hot section 58 and an injector nozzle 60. The injector-ignition fuel injector 30 supports the vaporization, pressurization, activation and dispensing of fuel in a real world maintenance free environment. A characteristic operating pressure for the injector-ignition fuel injector 30 of the invention is approximately 100 bar dispensing into a 20:1 compression ratio engine (20 bar) with a fuel load which produces a 40 bar peak. In a preferred implementation, the fuel injector 30 features an internal nickel molybdenum catalyst that is disposed within the hot section 58 of the fuel injector 30 near the injector nozzle 60. The catalyst may be activated by operating the injector body at a temperature of approximately 750° F. Of course, as would be appreciated by those of ordinary skill in the art, other catalysts and injector operating temperatures may be employed without departing from the scope of the invention.

Figure 7:
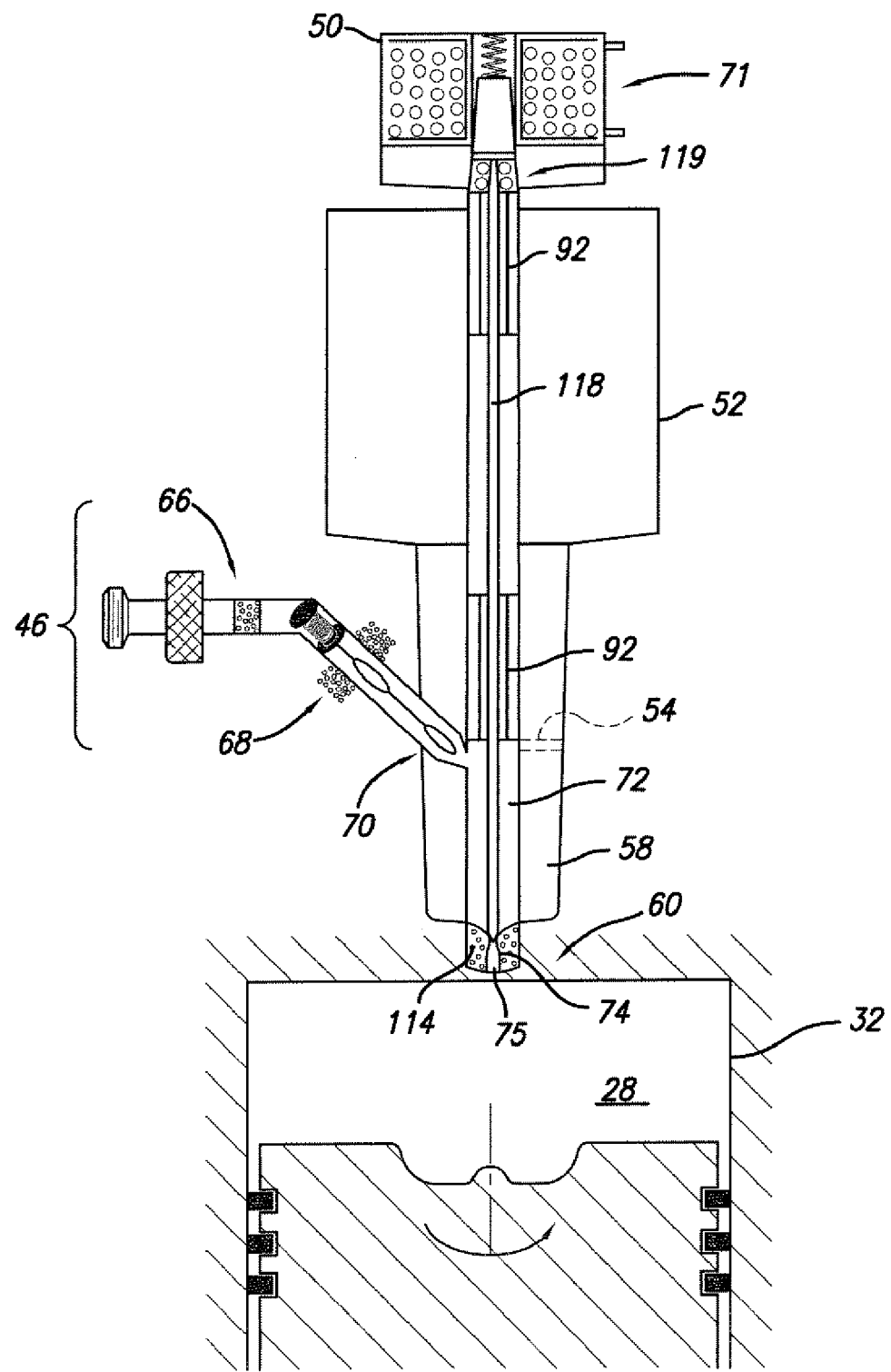
FIG. 7 is a sectional view of the heated catalyzed injector-ignition fuel injector of FIG. 6 showing the fuel inlet and outlet subsystems.

Referring to FIG. 7, the input fuel metering system 46 of the injector-ignition fuel injector 30 of the invention will now be described. Specifically, the input fuel metering system 46 includes an inline fuel filter 66 for filtering the fuel, a metering solenoid 68 for metering a next fuel charge comprising a predetermined amount of fuel, and a liquid fuel needle valve 70 for dispensing the next fuel charge into a pressurizing chamber 72 of the fuel injector 30. The liquid fuel needle valve 70 preferably comprises an electromagnetically or piezoelectric activated needle valve that dispenses the next fuel charge into the pressurizing chamber 72 in response to a look ahead computer control algorithm in the ECU of the internal combustion engine. The input fuel metering system 46 may accept fuel from a standard gasoline fuel pump or common rail distribution system.

With further reference to FIG. 7, the injector nozzle 60 of the fuel injector 30 is disposed between the pressurization chamber 72 and the combustion chamber 28 of the vehicle. The fuel charge dispensed by the input fuel metering system 46 is roasted in the pressurization chamber 72 via a hot section 58 of the fuel injector 30 surrounding the chamber 72. More particularly, the fuel charge is heated in the pressurization chamber 72 under pressure and in the presence of catalysts, which begin to crack the fuel and cause it to react with internal sources of oxygen. The injector nozzle 60 comprises an injector nozzle pin valve 74, a collimator 75, and a pin valve actuator 71. Specifically, the nozzle pin valve 74 opens at approximately top dead center (180° of cycle rotation), allowing the hot pressurized gas into the combustion chamber 28. The pin valve actuator 71 may comprise a pin valve solenoid which operates a pin valve drive shaft 118 for injecting the next fuel charge through the injector nozzle pin valve 74.

In the all-in-one fuel injector embodiment, the pin valve drive shaft 118 is located inside the bore of the pressurization ram 92 such that it may slide coaxially within the pressurization ram 92. However, the pin valve drive shaft 118 operates independently of the pressurization ram 92. An O-ring seal 119 on the top of the pressurization ram 92 blocks the leakage path between these two shafts. The geometry of the injector nozzle 60 varies substantially from a typical liquid fuel injector nozzle in that the injector nozzle 60 includes the pin valve 74 and a collimator 75 for collimating the heated fuel and dispensing a collimated, relatively low pressure charge of hot gas into the cylinder. Specifically, the injector nozzle 60 of the fuel injector 30 is electrically heated, for example using a conventional nichrome heating element 114 that lines the injector nozzle 60.

The pin valve actuator 71 of the injector nozzle 60 may comprise a rapid response electromagnetic drive or a piezoelectric drive. In its simplest form, the injector nozzle pin valve 74 opens to 100% as the pressurization ram 92 pushes the entire column of hot gas from the pressurizing chamber 72 into the combustion chamber 28 to full displacement of the injector volume. As would be understood by one of ordinary skill in the art, many combinations of pin valve and ram drive modulation may be employed with analog drive signals and/or digital pulse signals to produce various heat release profiles under different throttle and load situations, without departing from the scope of the present invention.

Referring to FIGS. 8A and 8B, another component of the injector-ignition fuel injector 30 comprises a pressurization ram system comprising the pressurization ram 92, the pressurization ram driver 52 and the hot section 58 of the fuel injector 30 for heating the next fuel charge in the pressurization chamber 72 prior to injection. In particular, FIG. 8A depicts a first configuration of the pressurization ram system, wherein the pressurization ram 92 is in a full displacement position.

FIG. 8B depicts a second configuration of the pressurization ram system, wherein the pressurization ram 92 is in a fully retracted position for allowing liquid fuel to enter the pressurization chamber 72. The pressurization ram 92 compresses the fuel as it transitions from a liquid to a gas, and then to its critical point and beyond, where it becomes a very dense vapor. The pressurization ram 92 comprises a magnetically active portion 96 disposed substantially within the pressurization ram driver 52, an insulating portion 97 and a hot section compatible portion 98 which is disposed substantially within the hot section 58 when the pressurization ram 92 is in the full displacement position. The rest position for the pressurization ram 92 is at full displacement as illustrated in FIG. 5A. The pressurization ram 92 may further comprise one or more of O-ring seals 100 for preventing fluid leakage.

With continued reference to FIG. 5B, when the pressurization ram 92 is retracted, it forms a partial vacuum in the pressurization chamber 72, thus allowing the input fuel metering system 46 to inject the next charge as a relatively cool liquid. The pressurization ram 92 has a relatively long stroke and may incorporate a heat shield region for protecting the input fuel metering system 46 from the high temperatures near the hot section 58. A multiple winding solenoid coil system 106, 108 disposed within the pressurization ram driver 52 includes a retraction solenoid 106 and a pressurization solenoid 108. The multiple winding solenoid coil system 106, 108 may be replaced by a linear stepping motor that is used to drive the pressurization ram 92.

The fuel injector 30 of the invention is inherently safe in that it only requires a single firing of fuel above the auto-ignition temperature, which may be contained in a robust metal housing directly connected to the engine cylinder (where combustion normally occurs). In this manner, the hot section 58 of the fuel injector 30 can be considered as a mere extension of the existing engine combustion chamber 28. By way of example, the hot section 58 of the fuel injector 30 may be electrically heated via a conventional nichrome heating element 116 which lines the hot section 58.

Under electronic control of the ECU, a sufficient magnetic field is applied to pressurize the fuel load to a predetermined level commensurate with the next firing, as specified by the operator's throttle position. The fuel charge is roasted in the pressurization chamber 72 (via hot section 58) under pressure in the presence of catalysts, which begin to crack the fuel and cause it to react with internal sources of oxygen. Such internal oxygen sources are present in conventional pump gas via included anti-knock agents and winter oxygenators such as MTBE and/or ethanol. Diesel fuels also commonly include oxygen sources in the form of cetane boosters. According to the invention, hot section catalysts may include without limitation: (1) nickel; (2) nickel-molybdenum; (3) alpha alumina; (4) aluminum silicon dioxide; (5) other air electrode oxygen reduction catalysts (e.g., as used in fuel cell cathodes and metal air battery cathodes); and (6) other catalysts used for hydrocarbon cracking.

According to a preferred implementation, the operating temperature of the hot section 58 is approximately 750° F., which substantially minimizes the corrosion and heat-related strength loss of common structural materials such as 316 stainless steel and oil hardened tool steel. In contrast, typical compression ignition operating temperatures are above 1000° F. The hot section 58 may further comprise a nichrome heating wire. According to additional embodiments, oxygen may be pumped into the hot section 58 of the fuel injector 30.

Referring again to FIG. 7, the injector-ignition fuel injector 30 may pull in hot exhaust gas during the exhaust cycle of the engine by opening the injector nozzle pin valve 74 and retracting the pressurization ram 92. Under normal circumstances, the hot exhaust gas will still have un-reacted oxygen, which can be optionally used in conjunction with the fuel's internal oxygenation agents to lightly oxidize the fuel. Additionally, the fuel injector 30 may be configured to include an air inlet pinhole 54 in communication with the pressurization chamber 72 such that additional oxygen in the form of fresh air can be added to the hot section 58 when the pressurization ram 92 is disposed in the fully retracted position. The air inlet pinhole 54 may be equipped with a one way valve such as a ball valve (not shown) to preclude fuel vapor leakage during the pressurization stroke. Additionally, various other forms of air may be employed such as exhaust gas.

According to some embodiments of the invention, heated catalyzed fuel injector 30 is inherently self-purging and self-cleaning. Specifically, the pressurizing ram 92 and the nozzle pin valve drive shaft 118 can be exercised repeatedly during engine starting operations, thereby (i) allowing air and moisture from long term engine stand to be purged on start, and (ii) allowing any carbon build up to be flushed through the relatively large injector nozzle 60. Unlike conventional fuel injectors, the pressurizing ram 92 moves over a relatively long stroke distance (0.25 inches or more) and can eliminate any void volume in the nozzle area 74 in its fully extended position.

In a preferred embodiment of the invention, the ECU may control one or more heated catalyzed injector-ignition fuel injectors 30 of the invention using a one firing cycle look-ahead algorithm for injector-ignition operation. The look-ahead algorithm for controlling injector-ignition timing may be implemented using a computer software program residing on the ECU, the software program comprising machine readable or interpretable instructions for controlling fuel injection. According to the look-ahead algorithm, preparation for the next engine firing starts immediately upon completion of the last engine firing. At this time, the fuel injector 30 is substantially empty of fuel, the pressurization ram 92 is in the full displacement position, the injector nozzle pin valve 74 is closed, and the hot section 58 is substantially at its operating temperature. In the simplest form of control, the ECU compares the throttle input to prior settings such as last throttle input, engine load, RPM, air inlet temperature, and other settings and electronic fuel controls. Using this information, the ECU determines the fuel load and the estimated time to the next firing.

The next firing cycle commences after an appropriate delay to minimize the fuel hold time in the hot section 58, thus minimizing excessive cracking of the fuel. Initially, the next firing cycle involves retracting the pressurization ram 92, which allows the input fuel metering system 46 to dispense an aerosol of liquid fuel into the hot section 58. The pressurization ram 92 then pressurizes the fuel in a two step cycle, including (i) protecting the input liquid fuel injector 30 while the fuel is heating and vaporizing, and (ii) pressurizing the fuel to the target injection pressure and temperature. In the second step, the fuel is vaporized to reach the target injection pressure and temperature.

After a pre-determined hold time, the injector nozzle pin valve 74 opens and the pressurization ram 92 pushes the fuel vapor column into the combustion chamber 28, such that the pressurization ram 92 reaches the full displacement position illustrated in FIG. 8A. In some embodiments, the pre-determined hold time may be back projected from the next top dead center event. The injector nozzle pin valve 74 then closes and the heated catalyzed fuel injector 30 is now ready for a next firing command. A wide range of variants with respect to the fuel injector cycle (e.g., interactive operation of the pressurization ram 92 and the injector nozzle pin valve 74 to tailor specific heat release profiles) are possible without departing from the scope of the invention. Since the main portion of the power stroke is merely a 30° rotation of a 720° four stroke cycle, the actual injection takes only approximately 4% of the available operating time.

In operation, fuel exposure time to the heated catalyst in the presence of available oxygen sources (e.g., dissolved air or oxygenators such as ethanol) within the pressurization chamber 72 is precisely controlled by the ECU. This exposure time, which may be referred to herein as "the pre-oxidation hold time", is critical to the proper operation of the fuel injector 30. For example, if the pre-oxidation hold time is too long and/or at too high a temperature, the fuel will begin to crack into shorter chain molecules and residual carbon. Such free carbon residue in the form of black deposits can contaminate the fuel injection system. On the other hand, if the pre-oxidation hold time is too short and/or at too low a temperature, insufficient pre-oxidation of the fuel may result, or no pre-oxidation at all.

At the cold extreme, the fuel injector 30 of the invention performs like a conventional diesel compression ignition fuel injector with relatively long ignition delays (e.g., in the range of 5-10 ms at 1800 RPM and 20:1 compression). Cold injection conditions result in reduced efficiency because the injection point must occur well ahead of top dead center to initiate combustion, thus generating push back and waste heat in the cylinder. In addition, low cetane rated fuels such as heptane, octane, and ethanol may not fire at all or will fire erratically under such cold injection conditions, as is typical of their behavior when used in conventional diesel engines.

The following example illustrates how optimal pre-oxidation hold time conditions may be determined in a laboratory engine. In particular, a laboratory test engine with 220 cm$^3$ displacement and 23:1 compression was outfitted with a heated catalyzed fuel injector 30 as disclosed herein, and utilizing a fuel mixture of approximately 65 parts heptane, 25 parts cetane and 10 parts ethanol by volume. During testing, the engine was operated at 1800 GM at approximately 1 horsepower gross output. In addition, the catalyst lining the inside of the hot section 58 consisted of nickel with about 5% molybdenum. A preferred catalytic heating temperature was determined to be approximately 720° F., which produced the lowest exhaust gas temperature and minimal carbon residue formation within the injector body.

The ignition delay of the fuel injector 30 was determined by comparing a laser based injector pin position indicator against a standard commercial Delphi knock sensor. Specifically, ignition delays of 100 microseconds or less (i.e., one degree of crank angle or less) were found at 1800 RPM. Increasing the catalytic heating temperature to about 800° F. caused rapid carbon build up which quickly impeded fuel flow, whereas reducing the catalytic heating temperature to below about 720° F. lengthened the ignition delay time and reduced engine power output due to the necessity of advancing the injection point well ahead of top dead center. At room temperature, this fuel mixture (i.e., 65% heptane, 25% cetane and 10% ethanol) would not fire in the test engine at all within the limits of the ignition advance allowed by the test system electronics (approximately 8 milliseconds). Fuel flow during testing was in the range of 3 cm$^3$ to 5 cm$^3$ per minute, while the hot section of the injector tip was approximately 2 cm long with a cross sectional area of 0.043 cm$^2$. Injector pressure was 1200 psi such that the fuel mixture was operating as a supercritical fluid at the optimal temperature setting (the critical temperature for heptane is about 512° F., and the critical pressure is about 397 psi).

In addition to the conventional parameters which affect fuel flow in an engine, the fuel injection system of the invention has particular sensitivities to fuel composition due to the use of the fuel as a super-critical fluid with a pre-oxidation heated catalytic stage, which makes the fuel sensitive to fuel cracking based carbon build up. In addition, since the fuel injector 30 may run on both high octane and high cetane rated fuels as well as mixtures of gas engine fuels and diesel engine fuels, the fuel delivery system is subjected to a much broader range of operating parameters than conventional gasoline (spark ignition) or diesel (compression ignition) engines. For example, various fuels may include a wide range of boiling points, critical pressures, critical temperatures, and susceptibility to thermal cracking. In addition, the fuel densities may range from 0.6 for pentane/hexane/heptane mixtures to well above 0.9 for some biodiesel formulations. Accordingly, usable fuel mixtures may span a broad range of fuel densities and various other catalytic sensitivities.

In view of the various fuel mixtures, the ECU utilizes conventional operating factors such as engine RPM and load to adjust fuel flow. Additionally, the ECU performs a look-ahead calculation to determine the optimal pre-oxidation hold time for the selected fuel mixture. The minimal pre-oxidation hold time is limited by the mechanical response time of the fuel injection system, which is typically in the range of 2-3 milliseconds. The maximum pre-oxidation hold time (for a one cycle look-ahead for a four stroke engine at 1800 RPM) is about 66.6 milliseconds (i.e., the approximate duration between firings). In addition to controlling fuel injection into the catalytic hot section, the ECU may also adjust the energy input into the hot section such that the fuel is heated to the designated temperature more rapidly at higher throttle settings than at lower throttle settings. However, the thermal time constants for such fuel injection systems are typically in the range of tenths of a second or higher (i.e., several firing cycles). In addition, if waste heat is utilized to reduce the electrical input to the heater (e.g., using active/passive heat pipes from the exhaust area), the thermal time constant will be even longer.

All practical engines have substantial rotary inertia which generally requires tenths of a second to seconds to overcome while changing from one RPM setting to another. According to some embodiments of the invention, additional look-ahead delays may be employed under certain throttle changes to accommodate further energy input. Also, the thermal input may be ramped electrically to accommodate new fuel flows. By way of example, during acceleration in a conventional automobile, the pre-oxidation hold time may be increased from a maximum of one cycle to two, three or even four cycles, by building up excess fuel in the hot section (e.g., by pumping fuel in faster than the fuel injector pin release rate). Under these conditions, thermal energy input can be ramped to bring the system back into a one cycle look-up delay. The control scenario is simpler on deceleration since fuel hold times can be dropped by a ratio of at least 30:1 at 1800 RPM (i.e., 66 milliseconds to 2 milliseconds).

Engine responsiveness using the fuel injector 30 of the invention varies widely by application. For example, a high performance sports car or race car is expected to have very fast throttle response. Injector-ignition systems in such applications may incorporate additional features to accommodate rapid throttle changes with minimal risk of carbon formation within the injector hot section. At the other extreme, a large stationary power generator which precisely maintains 60 Hz AC at a fixed output (e.g., about 1800 RPM), may have very slow changing throttle inputs, and therefore may be able to utilize a simplified form of the heated catalyzed fuel injection system of the invention.

The ECU of the internal combustion engine is capable of properly identifying the fuel mixture in use and then identifying appropriate pre-oxidizer hold time settings in an ECU database for its operation. In fuel injection systems that are restricted to conventional pump gasoline, this can be readily accomplished by pre-loading a table into the ECU database spanning the range of fuel octane ratings and oxygenator additives (e.g., MTBE, ethanol, other octane and cetane boosters, and other fuel oxygenator agents) that will be encountered within the vehicle's designated regional marketing operating area (i.e., U.S. spec versus Canadian spec versus European spec, etc.). The ECU may continuously tune its operation over this range of fuels by sensing the ignition delay. This is typically done today in modern diesel engines by comparing the actual injector opening position via a position sensor against a commercial engine knock sensor or, in some specialized cases, against an in-cylinder absolute pressure sensor.

A supplemental input to the ECU may be necessary to accommodate the wide range of fuels and mixtures for systems featuring flex fuel injector-ignition capability. For example, fuels containing a high percentage of ethanol and fuels which contain high cetane ratings (e.g., conventional diesel, biodiesel or vegetable oils) may require fuel mixture information, particularly when mixed with conventional gasolines at the fuel delivery pump or in the engine fuel tank. According to some embodiments of the invention, this information is provided using a direct entry scheme at fueling, as described hereinabove. Other embodiments utilize an on-board analyzer which samples the fuel on board and communicates engine operating parameters to the ECU.

The heated catalyzed fuel injection system disclosed herein may be highly sensitive to ignition timing. During operation, waste heat is minimized by initiating a very rapid burn ignition substantially at top dead center and completing the burn at a predetermined time to reduce waste heat losses (out the exhaust valve), increase power stroke production, and decrease fuel combustion noise. An injector-ignition system that is optimized in this manner may operate at very high compression (e.g., in the range of 20:1 to 40:1). It may be desirable in some applications to use the fuel injectors 30 of the invention in a light weight engine with a minimal flywheel and, thus, minimal rotational inertia.

In injector ignition equipped 1, 2, 3 or, 4 cylinder engines, compression braking (which occurs as the piston approaches top dead center) is a significant factor in engine timing. Conventional ECU timing algorithms tend to fire very early in this application because they do not accommodate the rapid deceleration which occurs near top dead center in this class of engine. Additionally, any real world fuel injector has a mechanical delay from the time the electrical fire signal is given to the time it injects fuel into the cylinder. Such mechanical delays are typically in the range of 1 to 3 milliseconds. To compensate for this mechanical delay, the ECU of the invention adjusts the timing of the injector fire signal when the engine is rapidly decelerating due to compression braking. In addition, a look-up table may be added to the ECU database which corrects for engine deceleration over a predetermined operating map including RPM, engine load, and engine load trend, i.e., deceleration or acceleration rates. The engine table may be pre-loaded with a learning algorithm to measure the error in predicted top dead center versus actual top dead center for this class of engine geometry. The table may be dynamically adjusted in operation through use of a learning algorithm which continually adjusts the table entries by computing the difference between an injection pin location indicator and an absolute top dead center indicator. This adjustment may be refined using knock sensor input, or using an in cylinder pressure sensor which detects absolute fire position versus top dead center.

It should be evident to one skilled in the art that timing adjustments to correct for compression braking can readily interfere with timing adjustments required for different grade fuels in conjunction with pre-oxidizer hold time requirements. The ECU of the invention may utilize pattern recognition heuristics such as the identification of a steady state throttle and load condition to fine tune the ignition delay drift due to compression braking. Such fine turning is separate and distinct from the conventional tuning that is typically required with respect to varying fuel mixtures.

With further reference to FIG. 7, the energy required to operate the injector nozzle 60 may theoretically be as little as to percent of the energy content of the drive fuel; however, practical engine design considerations such as size constraints on high temperature insulation could cause the heating requirements to rise to several percent of shaft output power if driven solely by electrical system power. Since the fuel injector 30 is immediately next to one or more engine exhaust ports during operation, a very effective source of waste heat is readily available. The fuel injector 30 of the invention may be housed directly in an exhaust port of a multi-valve engine where the flow through the exhaust valve may be selectively controlled. In addition, various active and/or passive heat pipe geometries that bring in heat from the exhaust zone may be utilized to reduce the electrical input to the heater.

Various automobiles may use three or more types of injectors in their direct injection gasoline power plant, including: (1) throttle body injectors for idling; (2) common rail intake port injectors for low speed operation; and (3) direct injectors for high speed operation. Likewise, the fuel injector 30 described herein may be used alone or in a wide range of combinations with throttle body and common rail injectors, with or without selectively operated spark ignition sources. Additionally, the fuel injector 30 may operate in a pure vapor mode or may dispense a mixture of vapor and liquid. In applications where high RPM and high loading are infrequent (e.g., for a typical economy car), it may be desirable to use a fuel injector with a relatively low thermal heating capability, such that pure vapor operation is limited to vehicle cruise operation, for example under about 3600 RPM. Such a fuel injector progressively passes more liquid above a predetermined throttle load setting, resulting in progressively lower efficiency operation but at much higher power levels than the pure vapor design point.

Referring to FIG. 9, in accordance with an alternative embodiment of the invention, the all-in-one fuel injector geometry described above is unfolded into a heated catalyzed linear fuel injector 30' comprising a liquid fuel metering system 46', a retraction solenoid 106', a pressurization solenoid 108', pressurization ram 92', an injector nozzle 60', a pin valve drive solenoid 71', a nozzle pin valve drive shaft 11' and a hot section 58'. This fuel injector configuration simplifies the rather complex and precise requirements of the coaxial placement of the pin valve drive shaft 11' inside the pressurization ram 92'. In other words, the pin valve drive shaft 118' is not disposed within the pressurization ram 92' and does not slide coaxially within the pin valve drive shaft 118'. Instead the pressurization ram 92' is disposed at an angle with respect to the pin valve drive shaft 118' as depicted in FIG. 9. It is noted, however, that this linear configuration reduces the self-purging and self-cleaning effectiveness of the all-in-one geometry in that the pressurization ram 92' is now off to one side and can no longer clean and purge the void volume around the injector nozzle 60'. This configuration utilizes the same ECU timing as the all-in-one injector depicted in FIGS. 7 and 8. In operation, a fuel charge dispensed by the input fuel metering system 46' is roasted via hot section 58' under pressure and in the presence of catalysts, which begin to crack the fuel and cause it to react with internal sources of oxygen. At approximately top dead center, the pin valve drive shaft 118' injects the hot pressurized gas into the combustion chamber via the injector nozzle 60'.

Both the all-in-one fuel injector 30 and the linear injector 30' may be operated at higher RPM and smaller physical size by replacing the liquid based input fuel metering system with a medium pressure, medium temperature feed system. This system, which may be shared among all the injectors on the engine, may utilize a medium pressure pump (e.g., in the 500 PSI range) and a pre-heating coil for maintaining fuel in vapor form at a sufficiently low temperature (e.g., 400° F.) to minimize hydrocarbon cracking and degradation. In operation, the pre-heated, pre-vaporized fuel charge is introduced into either of the above injector configurations at the inlet point of the drive ram, thereby reducing the ram's required displacement, size, and heat input, thus allowing higher speed operation.

According to additional embodiments of the invention, the above-described medium pressure pump may be replaced by an external high pressure liquid feed pump that feeds the pre-heating coil through a one way valve. Small diameter capillary tubing and fittings may be used to reduce the volume in the hot section. The system may be purged on shut down to minimize the build up of carbon from excessively cracked fuels. Various combinations of components of the above described pump embodiments may be combined. For example, the number of stages of pumping and placement of pumps can vary widely based on engine size, number of cylinders, fuel recovery system geometry and other factors.

Thus, it is seen that an injector-ignition fuel injector for an internal combustion engine is provided. One skilled in the art will appreciate that the present invention can be practiced by other than the various embodiments and preferred embodiments, which are presented in this description for purposes of illustration and not of limitation, and the present invention is limited only by the claims that follow. It is noted that equivalents for the particular embodiments discussed in this description may practice the invention as well.

While various embodiments of the present invention have been described above, it should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof, the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

What is claimed is:

1. An injector-ignition fuel injection system for dispensing fuel into a combustion chamber of an internal combustion engine, the fuel injection system comprising:
an ECU controlling a heated catalyzed fuel injector for heating and catalyzing a next fuel charge, the fuel charge compromising a mixture of approximately 65% heptane, 25% cetane, and 10% ethanol by volume and wherein the ECU uses a one firing cycle look-ahead algorithm for controlling fuel injection.

2. An injector-ignition fuel injection system for dispensing fuel into a combustion chamber of an internal combustion engine, the fuel injection system comprising:
an ECU controlling a heated catalyzed fuel injector for heating and catalyzing a next fuel charge, wherein the fuel charge is catalyzed using a catalyst selected from the group consisting of nickel, nickel-molybdenum, alpha alumina, aluminum silicon dioxide, other air electrode oxygen reduction catalysts, and other catalysts used for hydrocarbon cracking and wherein the ECU uses a one firing cycle look-ahead algorithm for controlling fuel injection.

3. An injector-ignition fuel injection system for dispensing fuel into a combustion chamber of an internal combustion engine, the fuel injection system comprising:
an ECU controlling a heated catalyzed fuel injector for heating and catalyzing a next fuel charge, wherein the ECU uses a one firing cycle look-ahead algorithm that estimates time to the next firing for controlling fuel injection.

4. The fuel injection system of claim 3, wherein the look-ahead algorithm comprises a computer software program residing on the ECU, the software program comprising machine readable or interpretable instructions for controlling fuel injection.

5. An injector-ignition fuel injection system for dispensing fuel into a combustion chamber of an internal combustion engine, the fuel injection system comprising:
an ECU controlling a heated catalyzed fuel injector for heating and catalyzing a next fuel charge, wherein the ECU uses a one firing cycle look-ahead algorithm that compares a current throttle input to prior engine data and determines a fuel load and an estimated time to the next firing for controlling fuel injection.

6. The fuel injection system of claim 5, wherein the prior engine data comprises a last throttle input, an engine load, an RPM value, and an air inlet temperature.

7. An injector-ignition fuel injection system for dispensing fuel into a combustion chamber of an internal combustion engine, the fuel injection system comprising:
an ECU controlling a heated catalyzed fuel injector for heating and catalyzing a next fuel charge, wherein the ECU uses a one firing cycle look-ahead algorithm for controlling fuel injection, wherein the algorithm adjusts energy input into the fuel injector such that the fuel is heated to a selected temperature more rapidly at a higher throttle settings than at lower throttle settings.

8. The fuel injection system of claim 7, wherein the algorithm allows up to four firing cycles of fuel to build up in the hot section to increase fuel heating exposure time during rapid acceleration.

9. An injector-ignition fuel injection system for dispensing fuel into a combustion chamber of an internal combustion engine, the fuel injection system comprising:
an ECU controlling a heated catalyzed fuel injector for heating and catalyzing a next fuel charge, wherein the ECU uses a one firing cycle look-ahead algorithm for controlling fuel injection, wherein the ECU includes a supplemental input for receiving fuel mixture information to accommodate a range of fuels and fuel mixtures.

10. The fuel injection system of claim 9, wherein the fuel mixture information is provided using a direct entry scheme at fueling or using an on-board analyzer which samples the fuel on board and communicates engine operating parameters to the ECU.

11. An injector-ignition fuel injection system for dispensing fuel into a combustion chamber of an internal combustion engine, the fuel injection system comprising:
an ECU controlling a heated catalyzed fuel injector for heating and catalyzing a next fuel charge, wherein the ECU uses a one firing cycle look-ahead algorithm for controlling fuel injection, and, wherein the ECU utilizes pattern recognition heuristics to fine tune ignition delay drift due to compression braking.

12. The fuel injection system of claim 11, wherein the pattern recognition heuristics provide for the identification of a steady state throttle and load condition.

13. An injector-ignition fuel injection system for dispensing fuel into a combustion chamber of an internal combustion engine, the fuel injection system comprising:
an ECU controlling a heated catalyzed fuel injector for heating and catalyzing a next fuel charge, wherein the ECU uses a one firing cycle look-ahead algorithm for controlling fuel injection;
wherein the heated catalyzed fuel injector comprises:
an input fuel metering system for dispending a next fuel charge into a pressurizing chamber;
a pressurization ram system including a pressurization ram for compressing the fuel charge within the pressurizing chamber, wherein the fuel charge is heated in the pressurization chamber in the presence of a catalyst; and
an injector nozzle for injecting the heated catalyzed fuel charge into the combustion chamber of the internal combustion engine, wherein the injector nozzle opens after a pre-determined hold time and the pressurization ram pushes the fuel charge into the combustion chamber such that the pressurization ram reaches a full displacement position.

14. The fuel injection system of claim 13, wherein the pre-determined hold time is back projected from a next top dead center event.

15. An injector-ignition fuel injection system for dispensing fuel into a combustion chamber of an internal combustion engine, the fuel injection system comprising:
an ECU controlling a heated catalyzed fuel injector for heating and catalyzing a next fuel charge, wherein the ECU uses a one firing cycle look-ahead algorithm for controlling fuel injection and wherein a next firing cycle involves retracing the pressurization ram, which allows the input fuel metering system to dispense an aerosol of liquid fuel into the pressurization chamber;
wherein the heated catalyzed fuel injector comprises:
an input fuel metering system for dispensing a next fuel charge into a pressurizing chamber;
a pressurization ram system including a pressurization ram for compressing the fuel charge within the pressurizing chamber, wherein the fuel charge is heated in the pressurization chamber in the presence of a catalyst; and
an injector nozzle for injecting the heated catalyzed fuel charge into the combustion chamber of the internal combustion engine.

16. The fuel injection system of claim 15, wherein the pressurization ram then pressurizes the fuel in a two step cycle, including protecting the fuel injector while the fuel is heating and vaporizing, and pressurizing the fuel to a target injection pressure and temperature.

17. The fuel injection system of claim 15, wherein the fuel is vaporized to reach the target injection pressure and temperature.

18. An injector-ignition fuel injection system for dispensing fuel into a combustion chamber of an internal combustion engine, the fuel injection system comprising:
an ECU controlling a heated catalyzed fuel injector for heating and catalyzing a next fuel charge, wherein the ECU uses a one firing cycle look-ahead algorithm for controlling fuel injection, wherein the algorithm identifies appropriate pre-oxidizer hold time settings in an ECU database based upon a predetermined fuel mixture in use.

19. The fuel injection system of claim 18, wherein the ECU database contains a pre-loaded table spanning a range of fuel octane ratings and oxygenator additives that may be encountered.

20. The fuel injection system of claim 19, wherein the oxygenator additives are selected from the group consisting of MTBE, ethanol, other octane and cetane boosters, and other fuel oxygenator agents.

21. The fuel injection system of claim 19, wherein the ECU continuously tunes its operation over the range of fuel octane ratings by sensing ignition delay.

22. An injector-ignition fuel injection system for dispensing fuel into a combustion chamber of an internal combustion engine, the fuel injection system comprising:
an ECU controlling a heated catalyzed fuel injector for heating and catalyzing a next fuel charge, wherein the ECU uses a one firing cycle look-ahead algorithm for controlling fuel injection and adjusts an injector fire signal to compensate for rapid rotational deceleration that occurs just before top dead center in high compression engines.

23. The fuel injection system of claim 22, wherein the ECU includes an engine look-up table which corrects for engine deceleration over a predetermined operating map including RPM, engine load, and engine load trend.

24. The fuel injection system of claim 23, wherein the engine look-up table is pre-loaded with a learning algorithm to measure the error in predicted top dead center versus actual top dead enter for a particular class of engine geometry.

25. The fuel injection system of claim 23, wherein the engine look-up table is dynamically adjusted in operation through use of a learning algorithm which continually adjusts table entries by computing the difference between an injection pin location indicator and an absolute top dead center indicator.

26. The fuel injection system of claim 25, wherein the adjustment is refined using knock sensor input, or using an in cylinder pressure sensor which detects absolute fire position versus top dead center.

* * * * *